May 4, 1965    L. A. OLLIVIER ETAL    3,182,241
MEASURING APPARATUS INCLUDING A BALANCING SERVO SYSTEM
Filed Sept. 8, 1961

INVENTORS
LOUIS A. OLLIVIER
JAMES B. SKITT, Jr.
ROY F. SCHMOOCK &
BY HARRIS SHAFFER

ATTORNEYS

United States Patent Office 3,182,241
Patented May 4, 1965

3,182,241
MEASURING APPARATUS INCLUDING A
BALANCING SERVO SYSTEM
Louis A. Ollivier, Huntingdon Valley, James B. Skitt, Jr., Limekiln Pike, Chalfont, Roy F. Schmoock, Northampton, and Harris Shaffer, Abington, Pa., assignors to Fischer & Porter Company, Warminster, Pa., a corporation of Pennsylvania
Filed Sept. 8, 1961, Ser. No. 136,933
8 Claims. (Cl. 318—31)

This invention relates to measuring apparatus, which term is used in the broad sense of apparatus for indicating and/or recording the value of a variable, and/or for effecting control in response to a variable whether or not indication or recording is simultaneously effected.

The general object of the invention is the provision, for such measuring apparatus, of a system for conversion of motion to an electrical signal. One of the particular advantageous objects of the invention is that of providing an apparatus capable of remote transmission of signals on a "two-wire" transmission line, this term being inclusive of such transmission as might be effected over a single line with ground return. In the attainment of this object, a common line is used both for powering an operating apparatus and for carrying the measuring current, the current both supplying the power and constituting the measuring signal being a variable direct current.

A further object of the invention is concerned with the provision of an apparatus in which accurate following of a contoured element by a follower is achieved without actual contact, the apparatus involving a motion-balance feedback. As will become apparent hereafter, the apparatus is also applicable to force-balance systems.

A further object of the invention has to do with attainment of results such as described in very simple and reliable fashion utilizing transistors so that low power levels are involved.

Figure 1:
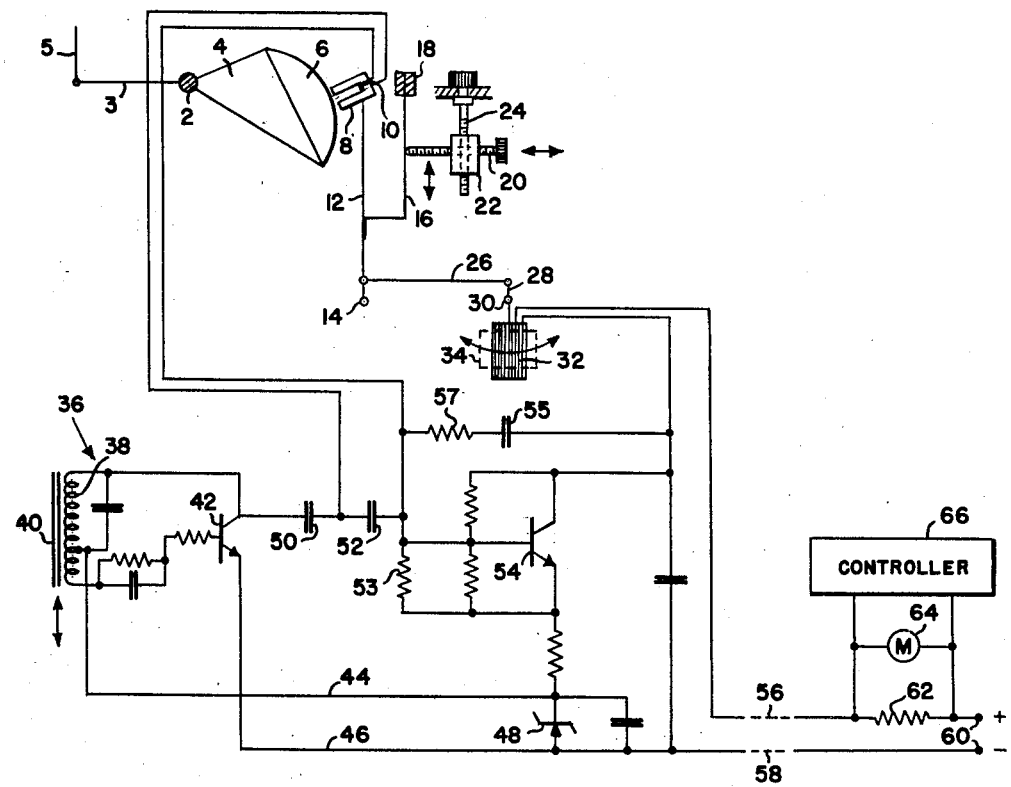
Figure 2:
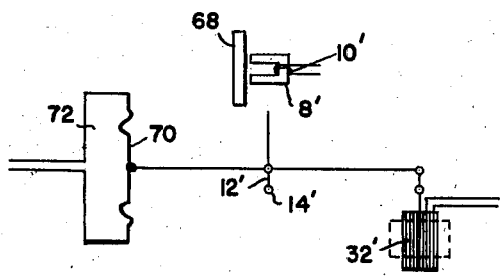

The foregoing and other objects of the invention will become apparent from the following description, read in conjunction with the accompanying drawing, in which:
FIGURE 1 is a mechanical and electrical diagram illustrating the elements of a preferred embodiment of the invention; and
FIGURE 2 is a fragmentary diagram illustrating such modifications of FIGURE 1 as would be involved in application of the invention to a force-balance system.

While, as will be obvious from the following description, the invention is very broadly applicable, attention may be called to the application of Ollivier and Skitt, Serial No. 82,984, filed January 16, 1961. The apparatus of said application is typical of the type of measuring system to which the present application is applicable. In said prior application there is specifically disclosed a system for the measurement of flow in which a magnetized float in a tapered tube effects rotation of a shaft by attracting a contoured element secured to the shaft. In this type of operation it is evident that the shaft must be mounted with a minimum of frictional restraint to secure accurate flow measurements, and consequently is not available for the adjustment of any such device as a variable resistance or the like. Accordingly, still referring to said prior application, the shaft carries a contoured vane associated with a nozzle assembly which is mounted to follow the edge of the vane as it rotates in response to flow. This system, giving rise to a pneumatic output, applies no appreciable restraint to the shaft and hence is satisfactory for the desired purpose. In accordance with the present invention a quite similar system is provided to give rise to an electrical output rather than a pneumatic output, also in a fashion imposing no appreciable restraint on movement.

Referring first to FIGURE 1, there is indicated at 2 a shaft which, in most uses of the apparatus, would be mounted in anti-friction bearings. This shaft, if the apparatus is applied to the same uses as the apparatus of said prior application, may be provided with a contoured element adapted to follow magnetically a float. For generality, however, there is indicated arm 3 attached to the shaft through which it may be rotated by a link connection 5 to some device providing a motion corresponding to a variable. For this purpose any of many well known transducers may be used which will provide a motion as a function of a variable to be measured.

The shaft 2 carries a support 4 to which is secured a contoured element 6 which in the present apparatus may take the form of a shaped ferrite block. The contour of this is shaped to conform with the measurements to be made, whether linear or non-linear as may be desired.

Cooperating with the contoured edge of the element 6 is a core member 8, also desirably of ferrite, presenting toward the element 6 a gap as indicated. This core member carries a winding 10. As will appear hereafter, what is utilized for effecting following is the variation in inductance of the winding 10 depending on the spacing of the gap from the contour of the element 6.

The core 8 is carried by a lever 12 mounted on a fixed pivot at 14. A leaf spring 16 is anchored to the frame of the apparatus at 18 and has a variable fulcrum provided by the end of an adjustable screw 20 mounted in a slidable block 22 guiding in the machine frame and adjustable as to its position by means of a second adjusting screw 24. The screw 20 provides a zero or bias adjustment, while the screw 24, in shifting the block along the spring 16 provides range adjustment by changing the effective length of the spring, the lower end of which is secured to the lever 12, the contact of the spring with the screw 20 providing a variable fulcrum.

A link 26 which may take the form of a stiff though somewhat flexible wire connects the lever 14 to arm 28 secured to an oscillatable shaft 30 which carries a coil 32 of a d'Arsonval movement movable as indicated by the arrows with respect to a core system which is indicated at 34 comprising a pair of fixed magnets and a core within the coil to apply to the coil windings a constant and substantially uniform magnetic field, the arrangement being such that current through the coil 32 will produce its deflection and rocking of shaft 30, the torque exerted being substantially linearly related to the current through the coil.

A transistor oscilaltor is provided at 36 which operates at constant amplitude and frequency, the frequency being adjustable. This oscillator comprises a conventional circuit including coil 38 wound on an adjustable ferrite core 40, the adjustment of the latter providing for setting of frequency of the oscillator. The transistor involved in this oscillator is indicated at 42. For the purpose of securing high stability and constancy of operation the oscillator is powered through the leads 44 and 46 connected across a Zener diode 48 which maintains a constant supply voltage.

The output from the collector of the transistor is delivered through capacitor 50 to a parallel resonant network which consists of the winding 10 and fixed capacitor 52 together with incidental distributed capacities. While this resonant network might be tuned to be resonant near a predetermined frequency of the oscillator, it is more convenient to provide adjustment of the oscillator frequency with respect to the resonance fixed network by adjustment of the core 40. The particular frequency used is not critical, but a frequency of about 100 kilocycles per second has been found very suitable.

The output of the resonant circuit is fed to the base of a transistor 54 which is biased in usual fashion through resistors for class C operation. The resistor illustrated at 53 is desirably a thermistor to provide temperature compensation and may be chosen to suit the other components to provide this compensation. A feedback network comprising the capacitor 55 and resistor 57 is provided between the transistor collector and its base for the purpose of damping oscillations.

The collector of transistor 54 is connected to one terminal of the coil 32. From the other terminal of this coil and from the line 46 previously mentioned there runs the transmission line comprising the conductors 56 and 58, the dotted lines here indicating the possibility of a long two-wire transmission line which may separate the parts of the apparatus already described from those which follow.

At the ends of the lines 56 and 58 connections are made to direct current supply terminals 60 providing voltage and current suitable for the operation of the transistors used. In one of the lines, in series with the supply terminal, there is indicated a load resistor 62 from the ends of which the output is taken as to a meter 64, which may be of indicating or recording type, and/or a controller indicated at 66. The load resistance which is indicated separately at 62 may, of course, be internal to either 64 or 66. The controller 66 which is used may be of any suitable type and need not be detailed. It may be used to effect control of the process variable which is undergoing measurement as for example by control of a valve in a case in which flow is the variable, of a heating element if temperature is being measured, or of any other device controlling another variable.

The overall operation is as follows:

The output of the oscillator, which, as described, has a fixed frequency and amplitude, controls the input to the amplifier involving the transistor 54 through the parallel circuit of coil 10 and capacitor 52. The action is dependent upon the variation of inductance of coil 10 as the gap of its core moves towards and from the contour of element 60. (The core and gap are greatly exaggerated in size in the drawing for clarity of showing.) In a typical arrangement a motion of the core 8 relative to the contour of the element 6 of only 0.001 to 0.002 inch will produce a full scale change in the current through the coil 32. The device, accordingly, is extremely sensitive to the spacing between the core 8 and the contoured element 6. By reason of the fact that the current through coil 32 produces movement of the lever 12, this spacing is maintained essentially constant throughout operation, the terminals being, of course, connected so that the compensating motion is provided to maintain this condition. Operation is adjusted to one side of, but close to, the resonant peak of the circuit 10, 52 by adjustment of the frequency of the oscillator by the core 40. The core 8 will thus follow the contour of element 6 without touching the same and without exercising any appreciable restraining force on movement of the shaft 8.

By reason of the fact that the coil 32 acts in conjunction with the spring 16 (adjustments of which may be made as already indicated) the position of the lever 12 and the current through the coil 32 have an essentially linear relationship, the parts being dimensioned so that even though pivoting occurs at 14 and 30 this linear relationship is maintained quite accurately. Of course, widely divergent mountings of the mechanical elements may be used. The overall result is that the linear relationship also exists between the radial dimensions of the contour of element 6 with respect to the gap position and the current through the coil 32. As will be evident from the series connections, the current through the coil 32 is directly measured by the meter 64 and/or the controller 66. Since the oscillator operates at a fixed frequency and amplitude, its operation does not variably affect the current through the resistor 62, and the spacing between the gap of core 8 and the contour of element 6 is maintained very nearly constant.

It will be evident that since the measurement is made in terms of a variable direct current the length of the two-wire transmission line 56, 58 is quite immaterial. Only two conductors, furthermore, are involved both for supplying power to the apparatus from the terminals 60 and for measurement. The transistor 42 operates at a lower power level than the transistor 54 so that the Zener diode 48 in the emitter circuit of the latter may properly maintain substantially constant operation of the oscillator. Even if small variations in current taken by the oscillator did exist, that would not affect the operation, since that is dependent on the current through the coil 32 which is directly measured and which applies a proportional force to the lever 12 balanced by the linear spring 16, the result being that the position of the core 8 relative to the contour of element 6 is very accurately linearly related to the measured current. Because of the very accurate following of the contour of element 6 by the core 8, the radial range of this contour may be kept small so that the angular deviations of the moving elements remain correspondingly small through a full range of operation. Thus the elements may be pivoted without appreciable "cosine" effects, leading to simplicity of mountings.

While, in most cases, motion-balance is preferred, the electronic aspects of the invention are equally applicable to force-balance systems. To indicate how this is done, reference may be made to FIGURE 2 in which the elements corresponding to those in FIGURE 1 are designated by the corresponding numerals primed. In that figure the core 8' cooperates with a fixed ferrite block 68, which may, however, be adjustable for setting of a zero point of operation. The coil 32' here opposes deviation of a diaphragm 70 of a chamber 72 in which there exists a variable pressure to be measured. To the connections of coil 8' and of coil 32' there are joined the circuit elements identical with those of FIGURE 1. The operation is, of course, dependent upon maintenance of the spacing of core 8' from block 68 very nearly constant, so that the current through coil 32' is linearly proportional to the pressure. Spring action is provided by the stiffness of the diaphragm, or, alternatively by some suitable auxiliary spring system. The general applicability of this force-balance system will be obvious to those skilled in this art. Dimensional measurements may be made, of course, by causing a dimensional change to vary a linear (or even non-linear) spring tension balanced by the force exerted by coil 32'.

It will be evident that in the case of both the motion-balance system and the force-balance system the wound cores and the elements with which they cooperate may be interchanged as to movable and fixed status, i.e. the wound cores may be stationary and the cooperating elements movable, a capability of relative movement alone being significant.

It will be evident that details in embodiment of the invention may be made without departing from the scope thereof as defined in the following claims.

What is claimed is:

1. Apparatus comprising a pickup device, an element associated with said pickup device and spaced slightly therefrom, said pickup device and element being mounted for relative movement and conjointly providing a reactance variable with their relative positions, means biasing said pickup device and element for relative movement, means providing a tuned circuit including said reactance as a tuning element, an oscillator, motor means, connections through which said oscillator operates said motor means through said tuned circuit, connecting means through which said motor means produces in opposition to said bias relative movement between said pickup device and said element to maintain their relative position substantially constant, and means responsive to the current operating said motor means.

2. Apparatus comprising a pickup device including a winding, an element associated with said pickup device and spaced slightly therefrom, said pickup device and element being mounted for relative movement and conjointly providing an inductance variable with their relative positions, means biasing said pickup device and element for relative movement, means providing a tuned circuit including said inductance as a tuning element, an oscillator, motor means, connections through which said oscillator operates said motor means through said tuned circuit, connecting means through which said motor means produces in opposition to said bias relative movement between said pickup device and said element to maintain their relative position substantially constant, and means responsive to the current operating said motor means.

3. Apparatus comprising a pickup device, an element associated with said pickup device and spaced slightly therefrom, said pickup device and element being mounted for relative movement and conjointly providing a reactance variable with their relative positions, means biasing said pickup device and element for relative movement, means providing a tuned circuit including said reactance as a tuning element, an oscillator, motor means, connections through which said oscillator operates said motor means through said tuned circuit, connecting means through which said motor means produces in opposition to said bias relative movement between said pickup device and said element to maintain their relative position substantially constant, means responsive to the current operating said motor means, and means powering said oscillator by the current flowing through said motor means.

4. Apparatus comprising a pickup device including a winding, an element associated with said pickup device and spaced slightly therefrom, said pickup device and element being mounted for relative movement and conjointly providing an inductance variable with their relative positions, means biasing said pickup device and element for relative movement, means providing a tuned circuit including said inductance as a tuning element, an oscillator, motor means, connections through which said oscillator operates said motor means through said tuned circuit, connecting means through which said motor means produces in opposition to said bias relative movement between said pickup device and said element to maintain their relative position substantially constant, means responsive to the current operating said motor means, and means powering said oscillator by the current flowing through said motor means.

5. Apparatus comprising a pickup device, an element associated with said pickup device and spaced slightly therefrom, said pickup device and element being mounted for relative movement and conjointly providing a reactance variable with their relative positions, means biasing said pickup device and element for relative movement, means providing a tuned circuit including said reactance as a tuning element, an oscillator, motor means, connections through which said oscillator operates said motor means through said tuned circuit, connecting means through which said motor means produces in opposition to said bias relative movement between said pickup device and said element to maintain their relative position substantially constant, means responsive to the current operating said motor means, means powering said oscillator by the current flowing through said motor means, and means maintaining substantially constant the power input to said oscillator.

6. Apparatus comprising a pickup device including a winding, an element associated with said pickup device and spaced slightly therefrom, said pickup device and element being mounted for relative movement and conjointly providing an inductance variable with their relative positions, means biasing said pickup device and elements for relative movement, means providing a tuned circuit including said inductance as a tuning element, an oscillator, motor means, connections through which said oscillator operates said motor means through said tuned circuit, connecting means through which said motor means produces in opposition to said bias relative movement between said pickup device and said element to maintain their relative position substantially constant, means responsive to the current operating said motor means, means powering said oscillator by the current flowing through said motor means, and means maintaining substantially constant the power input to said oscillator.

7. Apparatus comprising a pickup device, an element having a contoured edge associated with said pickup device with said pickup device spaced slightly from said edge, means mounting said element for movement in which different portions of said edge are brought into proximity with said pickup device, means mounting said pickup device for movement in a direction transverse to said edge, said pickup device and said element conjointly providing a reactance variable with their relative positions, means biasing said pickup device for movement relative to said element, means providing a tuned circuit including said reactance as a tuning element, an oscillator, motor means, connections through which said oscillator operates said motor means through said tuned circuit, connecting means through which said motor means produces in opposition to said bias movement of said pickup device to maintain substantially constant its position relative to the edge of said element, and means responsive to the current operating said motor means.

8. Apparatus comprising a pickup device including a winding, an element having a contoured edge associated with said pickup device with said pickup device spaced slightly from said edge, means mounting said element for movement in which different portions of said edge are brought into proximity with said pickup device, means mounting said pickup device for movement in a direction transverse to said edge, said pickup device and said element conjointly providing an inductance variable with their relative positions, means biasing said pickup device for movement relative to said element, means providing a tuned circuit including said inductance as a tuning element, an oscillator, motor means, connections through which said oscillator operates said motor means through said tuned circuit, connecting means through which said motor means produces in opposition to said bias movement of said pickup device to maintain substantially constant its position relative to the edge of said element, and means responsive to the current operating said motor means.

References Cited by the Examiner
UNITED STATES PATENTS

| 2,454,355 | 11/48 | Sunstein | 318—30 |
| 2,484,022 | 10/49 | Esval | 318—31 |
| 2,490,190 | 12/49 | Bailey | 318—30 |

JOHN F. COUCH, *Primary Examiner.*

FRED M. STRADER, *Examiner.*